Oct. 17, 1967     M. G. KAUFMAN     3,348,126
PHASE RATE COMPENSATOR

Filed Sept. 25, 1964     3 Sheets-Sheet 2

INVENTOR
MAXIME G. KAUFMAN

BY *James D. Murray*

ATTORNEYS

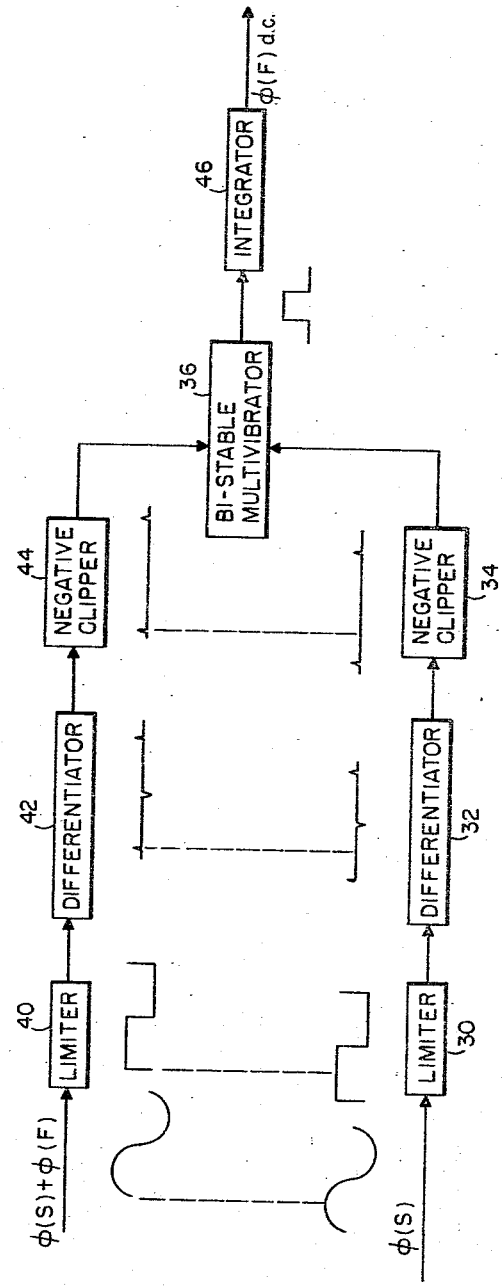

Patented Oct. 17, 1967

3,348,126
PHASE RATE COMPENSATOR
Maxime G. Kaufman, Camp Springs, Md., assignor to the United States of America as represented by the Secretary of the Navy
Filed Sept. 25, 1964, Ser. No. 399,416
9 Claims. (Cl. 332—18)

ABSTRACT OF THE DISCLOSURE

An electronic filtering circuit wherein phase shifts caused by the filter are eliminated. Filter output and input compared by phase meter generator which produces signal proportional to phase shift caused by filter. This signal used to phase modulate reference signal to be in phase with filter input.

The invention described herein may be manufactured and used by or for the Government of the United States of America for governmental purposes without the payment of any royalties thereon or therefor.

This invention relates to an electronic filtering system wherein, despite varying phase (frequency) and noise, the input and output signals remain fixed in phase relationship, and more specifically, to an electronic circuit, particularly suited for use in a system conveying information in the form of a varying phase signal, wherein the phase information is maintained free from distortion as the signal passes through a filter system.

Prior systems for maintaining phase integrity of a signal passing through electronic filters have, in general, been complex and not capable of attaining the accuracy which is required of, and attained by, the invention herein disclosed. Further, many of the prior systems were either not automatic or inherently possessed a time delay which precluded a complete maintenance of phase integrity.

Although the present invention has general utility in all electronics systems where the phase of a signal must be preserved while passing through a filter system, the invention was developed in connection with and is particularly adapted for use with a radio interferometer system which functions to detect the presence and location of an orbiting satellite. In this interferometer system, the information relating to the satellite direction is characerized by the phase of an electronic signal. To improve the signal to noise ratio it is necessary to pass the information-containing-signal through a narrow band filter system while at the same time preserving the phase of the signal. The problem is further complicated because the signal frequency is not constant but varies due to changes of phase caused by the relative speed of the satellite. An additional complication arises from the circumstance that, because the pertinent signal from the orbiting satellite can be very short, typically being of a duration of approximately one second, the phase must be electronically and automatically maintained without the use of mechanical expedients, such as servo systems, which have an appreciable time lag.

The general purpose of this invention is to provide a filtering system which will automatically and immediately maintain the phase integrity of a signal and which will avoid the aforedescribed disadvantages of prior systems. To attain this, the present invention contemplates the use of components which measure the phase shift caused by the filters and which produce another signal which, when combined with the signal of interest, restores the original phase to this signal.

It is, therefore, an object of this invention to provide an electronic system for filtering a signal wherein the phase of the signal, after filtering, is the same as the phase before filtering.

Another object is to provide a filtering system particularly adapted for use with an interferometer satellite surveillance system.

A still further object is to provide a fitering system wherein the phase shift caused by filters is automatically and immediately removed from a signal.

Yet another object of the present invention is the provision of an electronic filtering system wherein the phase shift of a signal passing through the filters is measured and another signal is produced which, when combined with the filtered signal, restores the filtered signal to its pre-filtered phase.

The exact nature of this invention as well as other objects and advantages thereof will be readily apparent from consideration of the following specifications relating to the annexed drawings in which:

FIG. 3 is a block diagram of the phase meter generator used in the embodiments of the invention illustrated in FIGS. 1 and 2.

Figure 1:
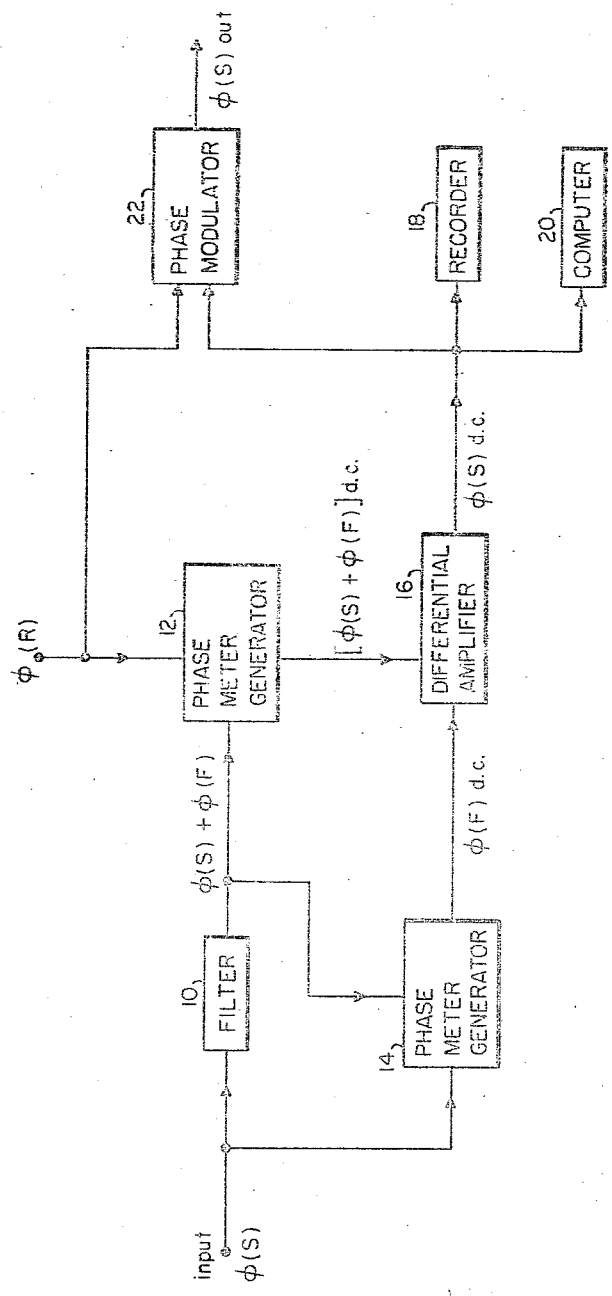
FIG. 1 is a block diagram of one embodiment of the invention.

Referring now to the drawings, wherein like reference characters designate like or corresponding parts throughout the several figures, there is shown in FIG. 1 a first embodiment of the invention wherein it is desired to send the incoming signal $\phi(S)$ through a narrow band filter 10 to improve the signal to noise ratio while simultaneously preserving the phase integrity of the output signal. Although it will be recognized that the incoming signal $\phi(S)$ could be any signal, for the purpose of specificity, this signal will be described herein as a signal coming from an interferometer system being used in a space surveillance system wherein the direction of a satellite is characterized by the phase of the signal $\phi(S)$ relative to the phase of a reference signal $\phi(R)$.

Because of the phase distortion resulting from filter 10, the filtered signal, that is, the output of the filter 10, will be of a phase symbolized as $\phi(S)+\phi(F)$. The output of filter 10 is connected to phase meter generators 12 and 14 which function substantially as phase discriminators or detectors but herein are termed "phase meter generators" to emphasize that in the described system these components generate useful signals which are proportional to the phase difference between the two input signals. A suitable form of phase meter generator is illustrated in FIG. 3 and is herein subsequently described in more detail.

Phase meter generator 12 is also connected to receive the phase reference signal $\phi(R)$ and functions to produce a D.C. signal proportional to the phase difference between the reference signal $\phi(R)$ and the filtered signal $\phi(S)+\phi(F)$. The output of generator 12 is conveniently symbolized as $[\phi(S)+\phi(F)]$D.C.

Phase meter generator 14 is connected to receive the incoming signal $\phi(S)$ and the output $\phi(S)+\phi(F)$ of filter 10 and functions to produce a D.C. signal proportional to the phase difference $\phi(F)$ between the filter input and output. The output of generator 14 is conveniently symbolized as $\phi(F)$D.C.

The D.C. outputs $[\phi(S)+\phi(F)]$D.C. and $\phi(F)$D.C. of phase meter generators 12 and 14 respectively are connected to differential amplifier 16 which functions to produce a D.C. signal proportional to the difference between the inputs. The output of differential amplifier 16, which conveniently can be symbolized as $\phi(S)$D.C. is connected to utilization devices, such as a recorder 18 or a computer 20. The output of differential amplifier 16 is also connected to phase modulator 22 which is also connected to receive and modulate the phase reference signal $\phi(R)$ and to produce an output signal $\phi(S)$ out which is of the same phase as the input signal $\phi(S)$.

Figure 2:
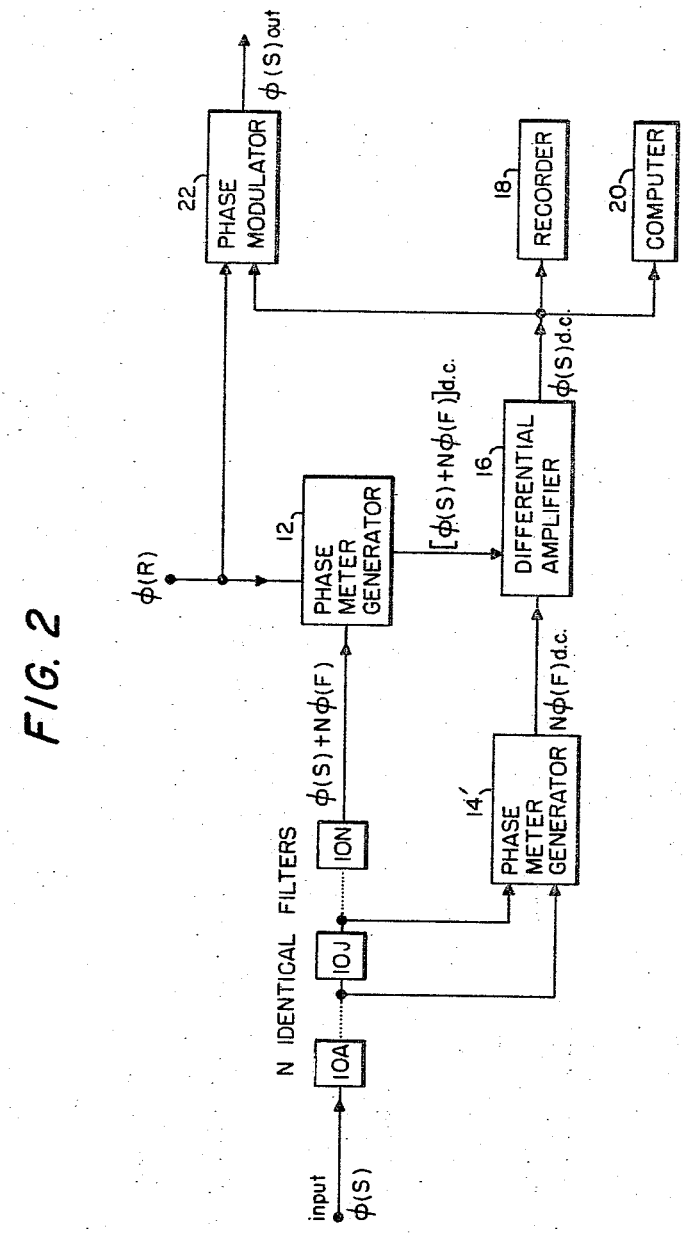
FIG. 2 is a block diagram of a second embodiment of the invention.

There may be occasions when it is desirable to repeatedly filter the input signal $\phi(S)$. The embodiment of the invention which is illustrated in FIG. 2 allows for such filtering by any number N of identical filters 10A...10N. The output of filter 10N can be symbolized as $\phi(S)+N\phi(F)$ which indicates that the N filters have caused N identical phase distortions to the input signal $\phi(S)$. The phase meter generator 14' is connected across only one of the filters 10J and is calibrated to produce an output $N\phi(F)$D.C. proportional to N times the phase distortion caused by filter 10J. The remainder of the embodiment in FIG. 2 is identical to that already described in relation to FIG. 1.

In FIG. 3 there is illustrated in block diagram form a phase meter generator which is suitable for use as the components 12, 14 and 14' in the embodiments of the invention illustrated in FIGS. 1 and 2. For purposes of discussion only, the inputs to the phase meter generator of FIG. 3 are illustrated as being the inputs to component 14 in FIG. 1.

The input signal $\phi(S)$ passes successively through limiter 30, differentiator 32 and negative clipper 34 to multivibrator 36. The other input signal $\phi(S)+\phi(F)$, wherein the phase distortion caused by filter 10 is illustrated as being a 90° phase lag, similarly passes successively through limiter 40, differentiator 42 and negative clipper 44 to multivibrator 36. As shown by the illustrated waveforms, the sinusoidal input signals are first changed to essentially square waves by limiters 30 and 40 and are then changed to alternating series of positive and negative spike pulses by differentiators 32 and 42. The negative spike pulses are eliminated by the negative clippers 34 and 44. The remaining positive spike pulses function to energize and deenergize bi-stable multivibrator 36, the phase difference between the input signals determining the duration of the multivibrator output pulses, which are in turn converted by integrator 46 into a D.C. voltage $\phi(F)$D.C. which is proportional to the phase difference between the input signals.

It will be recognized that suitable adjustment means must be included in either bi-stable multivibrator 36 or integrator 46 to allow for the calibration of the necessarily different phase difference input vs. voltage level output relationship required in component 14'.

The operation of the embodiment of the invention illustrated in FIG. 1 is by now, no doubt, evident. Periodic signal $\phi(S)$, the phase of which relative to reference signal $\phi(R)$ characterizes information such as the direction of a satellite, passes through filter 10 to improve the signal to noise ratio, and in so doing is phase distorted to the extent $\phi(F)$. The phase of the filtered signal $\phi(S)+\phi(F)$ is compared to the reference signal $\phi(R)$ and a D.C. signal $[\phi(S)+\phi(F)]$D.C. proportional to the phase difference between the filtered and reference signals is produced by phase meter generator 12. A similar phase meter generator 14 compares the phases of filtered signal $\phi(S)+\phi(F)$ and the unfiltered signal $\phi(S)$ and produces a D.C. signal $\phi(F)$D.C. proportional to the phase distortion caused by the filter. Differential amplifier 16 subtracts the signal $\phi(F)$D.C. from the signal $[\phi(S)+\phi(F)]$D.C. and produces a D.C. signal $\phi(S)$D.C. which is used to energize recorder 18 and computer 20 and which also controls phase modulator 22 to convert the reference signal $\phi(R)$ into an output signal $\phi(S)$ out having the same phase as the input signal $\phi(S)$.

The operation of the embodiment illustrated in FIG. 2 is similar except that more than one filter is used to improve the signal to noise ratio. The phase meter 14' must, of course, be calibrated accordingly.

It will be recognized that the invention disclosed provides a filtering system, particularly but not exclusively suited for use with a space surveillance interferometer system, wherein the effect of the phase shift caused by filtering is automatically and immediately removed from the output signal. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. An electrical filtering system wherein the effects of phase distortion caused by filtering are automatically and immediately removed from the filtered signal comprising:
   Filter means connected to receive and pass an electrical input signal;
   First generator means connected to said filter means to produce a first signal proportional to the phase distortion caused to said input signal in passing through said filter means;
   Reference means to produce a reference phase signal;
   Second generator means connected to said filter means and to said reference means to produce a second signal proportional to the phase difference between the filtered input signal and said reference phase signal and
   Differential amplifier means connected to receive and differentially combine said first and second signals
   Whereby the resultant of the differentially combined first and second signals is proportional to the phase of said input signal but not to the phase distortion caused by said filter means.

2. An electrical filtering system as set forth in claim 1 wherein a utilization device is connected to receive the output of said differential amplifier means.

3. An electrical filtering system as set forth in claim 2 wherein said first and second generator means are similar and each comprise:
   A multivibrator;
   Two signal input paths connected to said multivibrator, each path including a limiter, differentiator and negative clipper connected in series and
   An integrator connected to the output of said multivibrator
   Whereby the output of said integrator is proportional to the phase difference between the signals applied to said input paths.

4. An electrical filtering system as set forth in claim 3 wherein said filter means is a single filter and the two signal input paths of said first generator means are connected to the input and output of said single filter.

5. An electrical filtering system as set forth in claim 3 wherein said filter means comprise a series of identical filters and the two signal input paths of said first generator means are connected to the input and output of the same filter.

6. An electronic filtering system wherein the phase relationship between the input and output signals is automatically and immediately maintained comprising:
   Filter means connected to receive and pass an electrical input signal;
   First generator means connected to said filter means to produce a first signal proportional to the phase distortion caused to said input signal in passing through said filter means;
   Reference means to produce a reference phase signal;
   Second generator means connected to said filter means and to said reference means to produce a second signal proportional to the phase difference between the filtered input signal and said reference phase signal;
   Differential amplifier means connected to receive and differentially combine said first and second signals and to produce a resultant signal which is proportional to the phase of said input signal but not to the phase distortion caused by said filter means and
   Phase modulation means connected to said differential amplifier means and to said reference means whereby said reference phase signal is phase modulated by said modulation means to be of the same phase as said input signal.

7. An electronic filtering system as set forth in claim 6 wherein said first and second generator means are similar and each comprise:
A multivibrator;
Two signal input paths connected to said multivibrator, each path including a limiter, differentiator and negative clipper connected in series and
An integrator connected to the output of said multivibrator
Whereby the output of said integrator is proportional to the phase difference between the signal applied to said input paths.

8. An electronic filtering system as set forth in claim 7 wherein said filter means is a single filter and the two signal input paths of said first generator means are connected to the input and output of said single filter.

9. An electronic filtering system as set forth in claim 8 wherein said filter means comprise a series of identical filters and the two signal input paths of said first generator means are connected to the input and output of the same filter.

References Cited

UNITED STATES PATENTS

| | | | |
|---|---|---|---|
| 2,776,410 | 1/1957 | Guanella | 325—65 |
| 2,970,276 | 1/1961 | Dollinger | 330—149 |
| 3,117,278 | 1/1964 | Johnson | 325—65 |

ROY LAKE, *Primary Examiner.*

ALFRED L. BRODY, *Examiner.*